Oct. 2, 1962 R. T. BROWNE 3,056,626
ANTI-GLARE DEVICE FOR WINDOWS AND WINDSHIELDS
Filed Jan. 23, 1961 2 Sheets-Sheet 2

INVENTOR.
ROBERT T. BROWNE
BY
ATTORNEY 3,056,626
Patented Oct. 2, 1962

3,056,626
ANTI-GLARE DEVICE FOR WINDOWS AND WINDSHIELDS
Robert T. Browne, 230 W. 142nd St., New York, N.Y.
Filed Jan. 23, 1961, Ser. No. 84,077
3 Claims. (Cl. 296—97)

This invention relates generally to anti-glare devices.

The invention has especial use on the windshields of automotive vehicles but may be used equally as well on all types of windshields, such as the windshields of ships, smaller boats, airplanes and locomotive type vehicles. The invention may also be used on ordinary windows.

According to the invention, there is provided a flexible transparent screen of plastic sheet material, mounted at the windshield, and in the case of a vehicle movable past the field of vision of the driver of the vehicle. An envelope formed by two spaced transparent plastic plates is provided for guiding the movable screen. The transparent sheet or screen is provided with portions having different light transmissive or light filtering characteristics. The different transparencies are obtainable by staining, dyeing or otherwise coloring the various portions of the screen. The screen is automatically movable by an electromechanical drive system under control of a photoelectric cell and associated electronic circuit. Pneumatic means are provided for ventilating the screen and the windshield.

It is accordingly one object of the invention to provide an improved anti-glare system for the character described, wherein a flexible filter screen is mounted on rollers driven by an electromagnetically operated gear train, the movement of the screen being responsive to intensity of light impinging upon a photoelectric pickup associated with and controlling the drive means for the screen.

It is another object to provide a filter screen in an anti-glare system, the screen having predetermined areas colored to produce different systems, different areas of the screen having different degrees of transparency.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure, and in which the invention is shown on the windshield of an automobile for illustration purposes only:

FIG. 3 is a cross-sectional view taken on line 3—3 of FIG. 1.

FIG. 4 is a sectional view on an enlarged scale, taken on line 4—4 of FIG. 2, parts being broken away.

FIG. 5 is a diagram of the electronic circuit of the anti-glare system.

Figure 1:
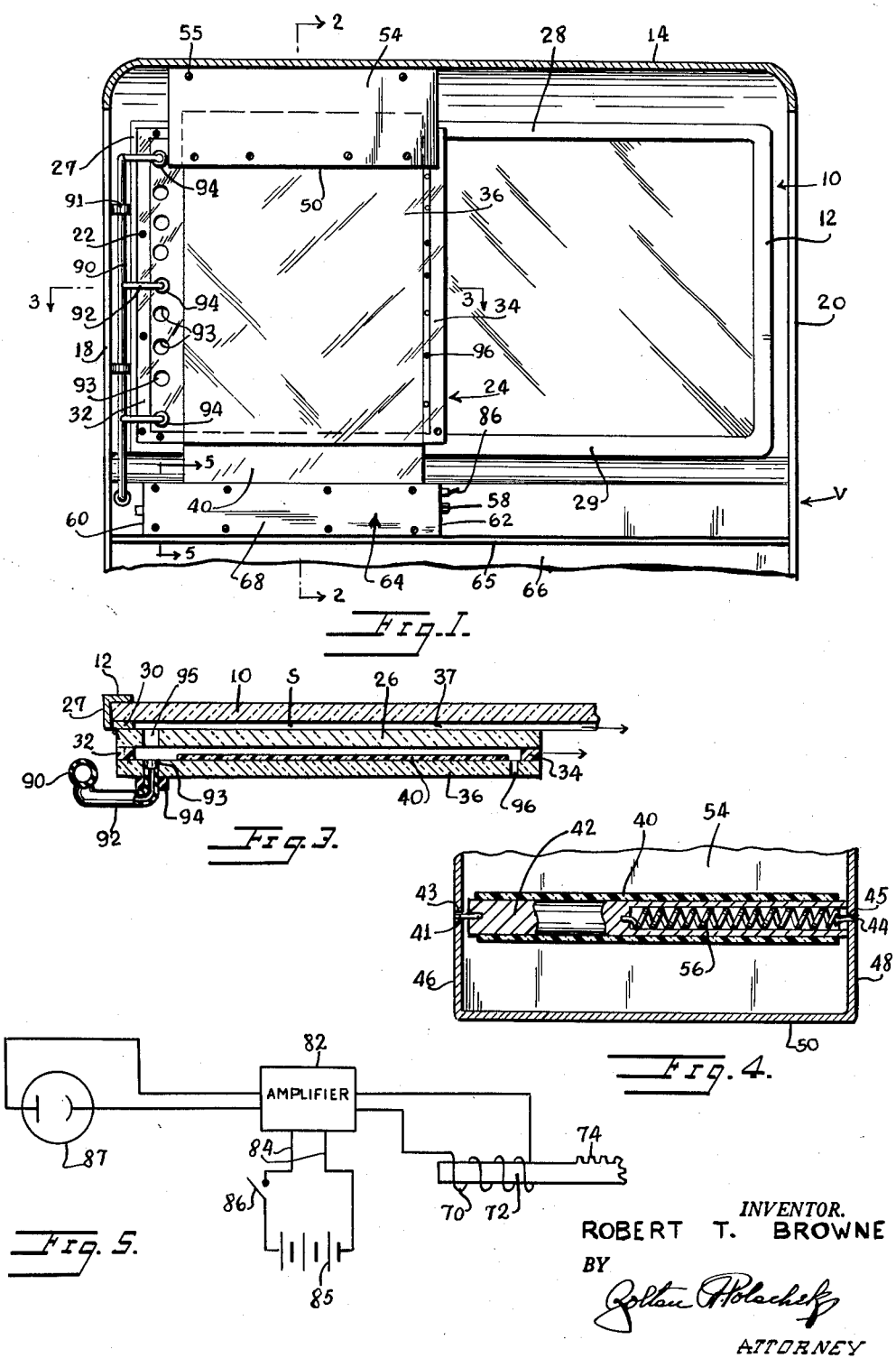
FIG. 1 is a front elevational view of an anti-glare system embodying the invention shown on the windshield of an automobile, parts being shown in section.
Figure 2:
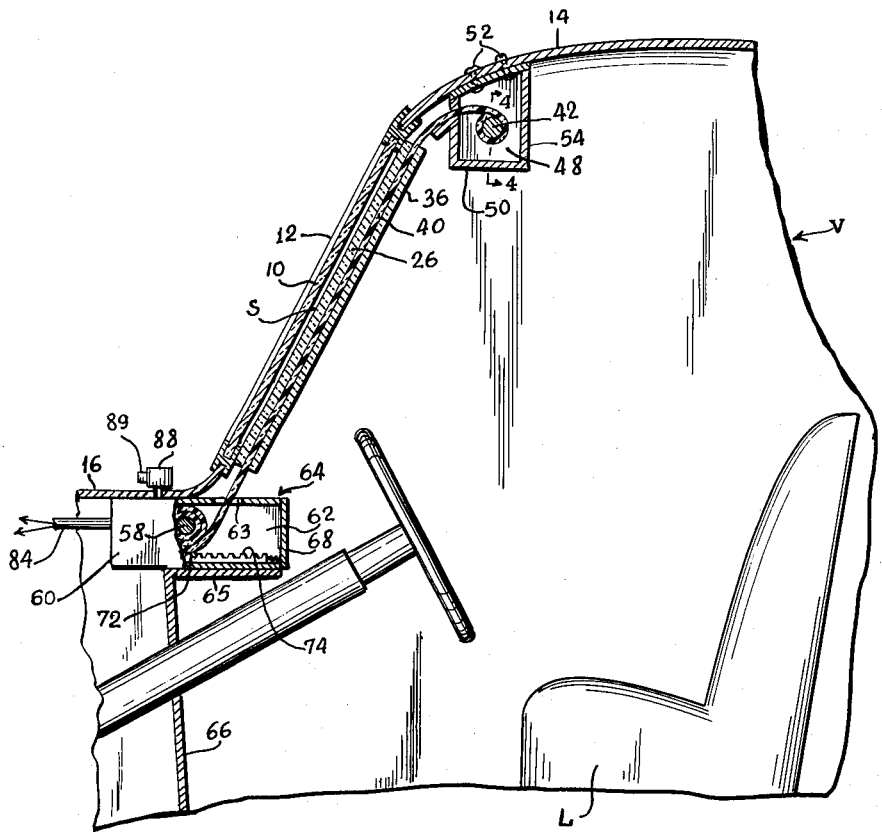
FIG. 2 is a vertical sectional view taken on line 2—2 of FIG. 1.

Referring to FIGS. 1–3, there is shown an automotive vehicle V having a front windshield 10 mounted in a frame 12 disposed in an opening between the roof 14, cowl 16 and body posts 18, 20. Secured to the frame 12 by screws 22 there is a screen assembly 24. The screen assembly is located at the left side of the windshield in front of the driver's position.

The screen assembly includes a first rectangular transparent plastic plate 26 which is supported on the front surfaces of the left side 27 and upper and lower sides 28, 29 of the frame. The plate 26 is slightly spaced from the windshield 10 by the thickness of the outer flange 30 of the frame 12, as best shown in FIG. 3. Two straight transparent plastic spacer strips 32, 34 are disposed at opposite vertical edges of the plate 26. A second transparent plastic plate 36 overlies the first plate 26 and is spaced therefrom by the strips 32, 34. The plates 26 and 36 are cemented to the strips to form a flat rectangular narrow compartment 37 open at opposite upper and lower ends.

A transparent flexible screen 40 of plastic sheet material is slidably disposed in the compartment 37 between the plates 26, 36 and is freely movable through the open ends of the compartment. The upper end of the sheet is engaged on a roller 42 shown to best advantage in FIG. 4. This roller is a cylindrical member having an axial pin 41 in one end and a flat key 44 at the other end engaged in a hole 43 and slot 45, respectively, at opposite sides 46, 48 of a casing 50. The casing is secured by bolts or rivets 52 to the roof of the vehicle. A removable cover 54 is mounted on the casing by screws 55. The roller 42 is partially hollow and has a coil spring 56 therein engaged at one end on the body of the roller and at the other end on the key 44. The roller is thus turnable against spring bias and is arranged so that the spring is always in tension tending to roll up the screen 40. This tension holds the screen in a flat position contacting the supporting plate 36, in all positions of the screen.

Figure 6:
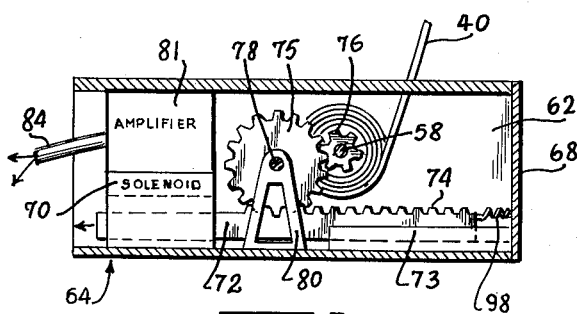
FIG. 6 is a side elevational view of a roller drive device employed in the system.

At its lower end, the screen 40 is engaged on another roller 58, journaled on opposite sides 60, 62 of a casing 64, see FIGS. 1 and 2. The screen passes through slot 63 in the top of the casing 64. This casing is mounted on a shelf 65 extending horizontally from the body partition 66 of the vehicle. The casing has a removable cover 68. Disposed in the casing is a drive means for the roller 58. This drive means, as shown best in FIG. 6, includes a solenoid 70 driving a plunger 72. The plunger is formed with teeth 74 defining a rack gear. A large spur gear 75 is meshed with the teeth 74 of the rack gear and a small gear 76 is meshed with the large gear. Gear 76 is carried on roller 58. Gear 75 has its own shaft 78 journaled in brackets 80.

The solenoid 70 is included in an electronic circuit shown in FIG. 5 and is actuated thereby. This circuit includes an amplifier 82 connected by wires 84 to the battery 85 of the vehicle. A switch 86 is in series with the battery and mounted on the side 62 of the casing 64; see FIG. 1. A photoelectric cell 87 is connected to the amplifier input. The output of the amplifier is connected to the solenoid coil 70. The photoelectric cell is mounted in a housing 88 on the cowl 16 of the vehicle in front of the windshield 10 as shown in FIG. 2. The photocell is exposed through a tube 89 extending into the housing 88 at the front thereof. The amplifier is located in a cabinet 81 in the casing 64. A channel 73 on the bottom of the casing supports and guides the plunger 72 in longitudinal movement.

A pipe or tube 90 is secured by clamps 91 to body post 18. This pipe has branch tubes 92 secured in openings 93 formed in plate 36. Washers 94 are cemented to the plate 36 to hold the tubes 92 in the holes. A plurality of holes 95 are formed in plate 26 at its left margin. These holes provide communication between the interior of the compartment 37 and the space S between the plate 26 and windshield 10. Small spaced holes 96 are formed at the right margin of plate 36 just to the left of spacer strip 34. Pipe 90 terminates at a blower or other source of a steady flow of air. The air blown into the interior of the compartment 37 leaves through holes 96 and the open right side of the space S between the plate 26 and windshield 10.

Figure 7:
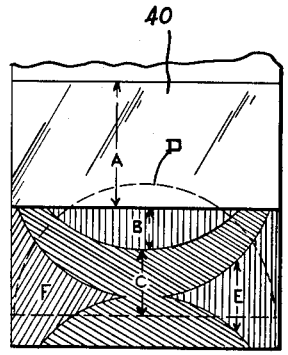
FIG. 7 is a diagrammatical view of the light screen used in the system.

FIG. 7 shows diagrammatically a preferred arrangement of the screen 40 to serve as a light screen. The upper portion A is wholly clear and transparent. Intermediate central segment B and right side portion E are slightly darkened. Lowermost central portion C is darker than portions B and E. Lower left side portion F is darkest and least transparent to light. This portion is generally triangular in form as is portion E.

This screen is especially adapted for night driving use, when bright headlights from an oncoming car will produce a strong beam of light traveling from right to left across the semicircular field of view D of the driver. This field of view is indicated by dotted lines in FIG. 7.

In operation of the system, the upper clear portion A of the screen will normally occupy the semicircular field D. Suppose another vehicle approaches with high-beam headlights on. The beam will sweep from right to left across the field of vision D and will become more intense as the other vehicle approaches closer and closer. When the other car is nearest, the beam will pass through the wider portion of the darkest area F to shield the driver most effectively from glare. The screen will move up as the approaching beam comes closer. In order to make the screen move up, plunger 72 will be retracted to the left as viewed in FIG. 6. This will cause gears 75, 76 to turn and unroll the screen from roller 58. The spring roller 42 will draw up the screen while the screen unrolls from roller 58. The plunger 72 will move to the right in FIG. 6 due to releasing tension in spring 98 to draw the screen down and roll it upon roller 58, after the approaching vehicle with its glaring light beam passes.

Response of the screen movement will be instantaneous and dependent on the light impinging on the photoelectric cell 87. The photoelectric cell will be located in the path of light beams entering the field of vision D of the driver on seat L to assure proper response of the system to the glaring light. The photoelectric cell pulses the amplifier 82 to a greater or lesser extent depending on the intensity of the approaching light beam. The amplifier in turn energizes coil 70 to actuate the plunger 72.

The air tubes 90, 92 serve the double function of preventing the screen sheet 40 from sticking to the plate 36 due to suction, and of preventing moisture from condensing in the space S between the windshield and plate 26, and in compartment 37 between plates 26 and 36.

If desired, the joined spaced plates 26 and 36 forming the compartment 37 could be used as a unit to replace the usual windshield of a vehicle. The improved system, however, is especially advantageous for installation as a safety accessory in existing automobiles, trucks, buses and other automotive vehicles.

It will be understood, of course, that the improved anti-glare device is readily installed on windshields of all types such as found on ships, smaller boats, airplanes and also on locomotive type vehicles. The anti-glare device can also be installed on ordinary windows. On locomotives, and on automotive type devices, the beam direction would be the same and the device would function the same, therefore, for these, the said special design sheet would be applied. In all of the other uses, just plain filtered or tinted sheets could be used.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. In an automotive vehicle or the like having a windshield, a pair of spaced, transparent, rectangular overlying plates defining a compartment with open opposite ends, a transparent, flexible plastic sheet disposed in the compartment between the plates and freely movable therethrough, said sheet constituting a screen, said sheet having portions of different selective transparency, rollers connected to opposite ends of the sheet, one of the rollers being spring tensioned for taking up slack in the sheet, electromechanical means at the other roller for driving the same and a photoelectric light responsive means controlling the electromechanical means to advance the plastic sheet through the compartment between the plates in response to varying intensity of impinging light beams, one of said portions at one edge of the screen being generally triangular in form and being darker than other portions of the screen, said plates being superimposed as a unit on the windshield and spaced slightly therefrom, one of the plates having at least one opening at one edge thereof, an air blower tube connected to the one plate and opening into the compartment between the plates, the other plate having at least one hole near said one edge, said one plate having apertures, at least one aperture at the other edge thereof being an exit aperture for releasing air blown in the compartment between the plates.

2. In an automotive vehicle or the like having a windshield, a pair of spaced, transparent, rectangular overlying plates defining a compartment with open opposite ends, a transparent, flexible plastic sheet disposed in the compartment between the plates and freely movable therethrough, said sheet having portions of different selective transparency, rollers connected to opposite ends of the sheet, one of the rollers being spring tensioned for taking up slack in the sheet, electromechanical means connected to the other roller for driving the same, and a photoelectric light responsive means controlling the electromechanical means to advance the plastic sheet through the compartment between plates in response to varying intensity of impinging light beams, one of said portions at one edge of the screen being generally triangular in form and being darker than other portions of the screen, said plates being superimposed as a unit on the windshield and spaced slightly therefrom, one of the plates having at least one opening at one edge thereof, an air blower tube connected to the one plate and opening into the compartment between the plates, the other plate having at least one hole near said one edge, said one plate having apertures, at least one aperture at the other edge thereof being an exit aperture for releasing air blown in the compartment between the plates, said electromechanical means including a solenoid driving a plunger having an outer portion formed as a rack gear, and a gear train meshed with and driven by said plunger for turning said one roller.

3. In an automotive vehicle or the like having a windshield, a pair of spaced, transparent, rectangular overlying plates defining a compartment with open opposite ends, a transparent, flexible plastic sheet disposed in the compartment between the plates and freely movable therethrough, said sheet constituting a screen, said sheet having portions of different selective transparency, rollers at opposite ends of the sheet, one of the rollers being spring tensioned for taking up slack in the sheet, electromechanical means at the other roller for driving the same, and a photoelectric light responsive means controlling the electromechanical means to advance the plastic sheet through the compartment in the plates in response to varying intensity of impinging light beams, one of said portions at one edge of the screen being generally triangular in form and being darker than other portions of the screen, said plates being superimposed as a unit on the windshield and spaced slightly therefrom, one of the plates having at least one opening at one edge thereof, an air blower tube connected to the one plate and opening into the compartment between the plates, the other plate having at least one hole near said one edge, said one plate having apertures, at least one aperture at the other edge thereof being an exit aperture for releasing air blown in the compartment between the plates, said photoelectric light responsive means including a housing mounted on the cowl of the vehicle in front of the windshield in a semicircular field of vision of the driver of the vehicle, said housing having an opening exposing said light responsive means.

References Cited in the file of this patent

UNITED STATES PATENTS

| | | |
|---|---|---|
| 2,091,380 | Stump | Aug. 31, 1937 |
| 2,605,133 | Newton | July 29, 1952 |
| 2,607,906 | Sang | Aug. 19, 1952 |

FOREIGN PATENTS

| | | |
|---|---|---|
| 527,801 | Belgium | Mar. 31, 1954 |
| 829,690 | France | Apr. 19, 1938 |
| 848,984 | France | Aug. 7, 1939 |
| 1,073,977 | France | Mar. 31, 1954 |
| 811,653 | Germany | Aug. 23, 1951 |
| 440,832 | Italy | Oct. 20, 1948 |
| 173,953 | Switzerland | Apr. 16, 1935 |